United States Patent
Purcell et al.

(10) Patent No.: US 7,659,498 B2
(45) Date of Patent: Feb. 9, 2010

(54) IMAGE SENSOR POWER SUPPLY INCLUDING AT LEAST ONE RIPPLE REJECTION CIRCUIT FOR REDUCING VARIATIONS IN THE SUPPLY VOLTAGE

(75) Inventors: Matthew Purcell, Edinburgh (GB); Arnauld Laflaquiere, Edinburgh (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 498 days.

(21) Appl. No.: 11/040,074

(22) Filed: Jan. 21, 2005

(65) Prior Publication Data

US 2005/0189470 A1   Sep. 1, 2005

(30) Foreign Application Priority Data

Jan. 22, 2004   (EP)   ................................... 04250324

(51) Int. Cl.
 *H01L 27/00*   (2006.01)
(52) U.S. Cl. ................................. 250/208.1; 250/214 R
(58) Field of Classification Search ............. 250/208.1, 250/214 R, 214.1, 214 P, 214 LA; 359/555–557; 348/241, 304–311; 257/290–292, 440
See application file for complete search history.

(56) References Cited

U.S. PATENT DOCUMENTS 6,977,490 B1 * 12/2005 Zhang et al. ................. 323/280
2003/0038230 A1 *  2/2003 Misek ..................... 250/214.1

FOREIGN PATENT DOCUMENTS

JP    2003044152 A   *  2/2003
WO   99/53683   10/1999

OTHER PUBLICATIONS

Hanumolu et al., Design of Low Noise, Low Power Linear CMOS Image Sensors, Apr. 30, 2001, Worcester Polytechnic Institute.

* cited by examiner

*Primary Examiner*—Que T Le
(74) *Attorney, Agent, or Firm*—Lisa K. Jorgenson; Allen, Dyer, Doppelt, Milbrath & Gilchrist, P.A.

(57) ABSTRACT

An image sensor includes a power supply ripple rejection circuit having an input connected to a supply voltage reference, and an output connected to an output voltage reference. The power supply ripple rejection circuit reduces the affect of variance in the supply voltage reference on the output voltage reference.

12 Claims, 4 Drawing Sheets

IMAGE SENSOR POWER SUPPLY INCLUDING AT LEAST ONE RIPPLE REJECTION CIRCUIT FOR REDUCING VARIATIONS IN THE SUPPLY VOLTAGE

FIELD OF THE INVENTION

The invention relates to power supplies for image sensors, and in particular, for correcting power supply ripples in reference power supplies for an image sensor.

BACKGROUND OF THE INVENTION

Many mobile devices, and in particular, mobile telephones, incorporate cameras based on silicon image sensor technology. Besides functioning as a camera, these mobile devices often provide functions such as, for example, a mobile telephone, a Bluetooth communication device, or an MP3 (Moving Pictures Experts Group 3 or MPEG3) player. Because these mobile devices need to increase the time that they can operate on a single battery charge, any function that is not required is usually switched off or put into a low power mode. Consequently, any reference voltages or current supplies on the device may vary slightly depending on the functions that are currently operating on the device and/or on the state of the battery itself. Other causes of power fluctuations can include electromagnetic interference from other devices and/or from other functions within the same device.

An image sensor, or pixel, requires reference voltage and/or current supplies to enable the switching of transistor gates, and the readout of a photodiode or other light-detecting device. An amplifier acting as a regulator of the battery supply is normally used to supply the reference voltages. Variance in the reference voltages can affect the value read out from the pixel. Typically, the battery supply voltage can vary by ±100 mV whereas the sensitivity associated with a pixel is typically ±100 µV. Hence, the reference voltages may vary more than the sensitivity of the pixel.

To enable an image to be created, the values of an array of pixels are read out. This is usually done one row at a time. If any of the reference supplies vary during the read out of the array of pixels, inconsistencies between individual pixels can occur. In general, the image quality can be adversely affected by changes in the reference voltage and current supplies.

For example, consider a three-transistor (3T) pixel, as shown in FIGS. 1a and 1b, operating with a double sampling timing. To describe the intended operation of the pixel, it will be assumed that all reference supplies are ideal.

For a first sample reading, the pixel is first reset, by turning on transistors MRD and MRST. This causes a node VPIX to be pulled up to a pixel reference voltage VRT. The pixel is then released, by turning off transistors MRD and MRST, so that it can start integrating. By doing so, a charge injection from MRST causes a drop in the voltage of VPIX, thus:

$$VPIX = VRT - V_{inj}$$

The pixel's capacitor CPIX is then discharged by the photo-diode current $I_{pd}$, leading to:

$$VPIX = VRT - V_{inj} - \left(\frac{I_{pd} \cdot t}{CPIX}\right)$$

Once the integration time is over, MRD is turned on and the buffered value of VPIX, that is an output node VX, is read out. Ideally it is equal to:

$$VX = VPIX - V_{GS}(MBUF) = VRT - V_{inj} - \left(\frac{I_{pd} \cdot t}{CPIX}\right) - V_{GS}(MBUF)$$

The first sample measured value of VX contains not only information about ambient light, but also information about the pixel's offset and is stored as VSIG.

To eliminate the offset, a second sample reading is made by turning on MRST (VPIX=VRT), then turning it off (VPIX=VRT-$V_{inj}$). This leads to a second sample measurement, referred to as VBLK, and is equal to:

$$VBLK = VX = VRT - V_{inj} - V_{GS}(MBUF)$$

Information about luminosity can be determined by subtracting VSIG from VBLK. This leads to a value of VLUM:

$$VLUM = VSIG - VBLK = \left(\frac{I_{pd} \cdot t}{CPIX}\right)$$

Variations on how RSTHI, RDHI, VRT, and ICOL affect the measurement of light will now be examined. At first the pixel is reset:

$$VPIX = VRT + \partial VRT_1$$

The pixel is then released for integration, which leads to a sudden decrease in VPIX. However, this injection is not ideal and has a dependency on the supply RSTHI such that:

$$VPIX = VRT + \partial VRT_1 - V_{inj} - (A \cdot \partial RSTHI_1 \cdot V_{inj})$$

The variable A represents a technology dependent constant related to the supply RSTHI.

The pixel then integrates, leading to:

$$VPIX = VRT + \partial VRT_1 - V_{inj} - (A \cdot \partial RSTHI \cdot V_{inj}) - \left(\frac{I_{pd} \cdot t}{CPIX}\right)$$

Once the integration time is over, VX is read out and is equal to VPIX-$V_{GS}$(MBUF). However, the transistor MRD is not a perfect switch, and an offset dependant on RDHI will be introduced. This offset will be defined by B×δRDHI$_1$, where B represents a technology dependent constant related to the supply RDHI.

The $V_{GS}$ drop of MBUF is dependant on ICOL, thus an offset δ$V_{GS}$(MBUF)$_1$ needs to be added to $V_{GS}$(MBUF). This first sample measurement VSIG is now:

$$VSIG = VRT + \partial VRT_1 - V_{inj} - (A \cdot \partial RSTHI_1 \cdot V_{inj}) - \left(\frac{I_{pd} \cdot t}{CPIX}\right) - V_{GS}(MBUF) - \partial V_{GS}(MBUF)_1 + (B \cdot \partial RDHI_1)$$

To eliminate the offsets of the pixel, a second measurement is made by turning on MRST (VPIX=VRT+δVRT$_2$), then turning it off:

$$VPIX = VRT + \partial VRT_2 - V_{inj} - (A \cdot \partial RSTHI_2 \cdot V_{inj})$$

This value is then measured as VBLK, which is equal to:

$$VBLK = VPIX = VRT + \partial VRT_2 - V_{inj} - (A \cdot \partial RSTHI_2 \cdot V_{inj}) - V_{GS}(MBUF) - V_{GS}(MBUF)_2 + (B \cdot \partial RDHI_2)$$

As done previously, the information about luminosity can be extracted by subtracting VSIG from VBLK. This leads to the following value of VLUM:

$$VLUM = \left(\frac{I_{pd} \cdot t}{CPIX}\right) + \partial VRT_2 - \partial VRT_1 - A \cdot V_{inj}(\partial RSTHI_2 - \partial RSTHI_1) + B(\partial RDHI_2 - \partial RDHI_1) - (\partial V_{GS}(MBUF)_2 - \partial V_{GS}(MBUF)_1)$$

Clearly, VLUM is affected by supply variations and the quality of the measurement is affected.

Previously, little or no attention has been paid to the degradation caused by varying reference supplies to an image sensor. Research has instead concentrated on other aspects of degradation, such as fixed pattern noise or reset noise. However, as mobile devices are integrated with many new circuits and functions, this source of image quality loss is likely to become more prevalent.

SUMMARY OF THE INVENTION

An object of the invention is to reduce image sensor degradation caused by varying reference supplies.

This and other objects, features, and advantages in accordance with the invention are provided by an image sensor including a supply voltage and at least one reference voltage. The image sensor may also include at least one power supply ripple rejection circuit comprising an input connected to the supply voltage, and an output connected to the at least one reference voltage. The power supply ripple rejection circuit may reduce the affect of variance in the supply voltage on the at least one reference voltage.

Preferably, the image sensor may also include a sensor reference voltage, a read reference voltage and a reset reference voltage. The power supply ripple rejection circuit may further comprise an amplifier. The amplifier may include Ahuja compensation.

Alternately, the power supply ripple rejection circuit enabled to output the sensor reference voltage may comprise a transistor. The transistor may be enabled as a source follower with the image sensor acting as a load of the source follower.

Such an architecture may be more current efficient than having a standard regulator. From a layout perspective, it can be column based, making the system compact and easily scalable. The parasitic capacitance of the pixel array associated with a transistor of the above embodiment may be sufficient to allow rejection of variance in the supply voltage.

DETAILED DESCRIPTION OF THE PREFERRED EMBODIMENTS

Figure 1A:
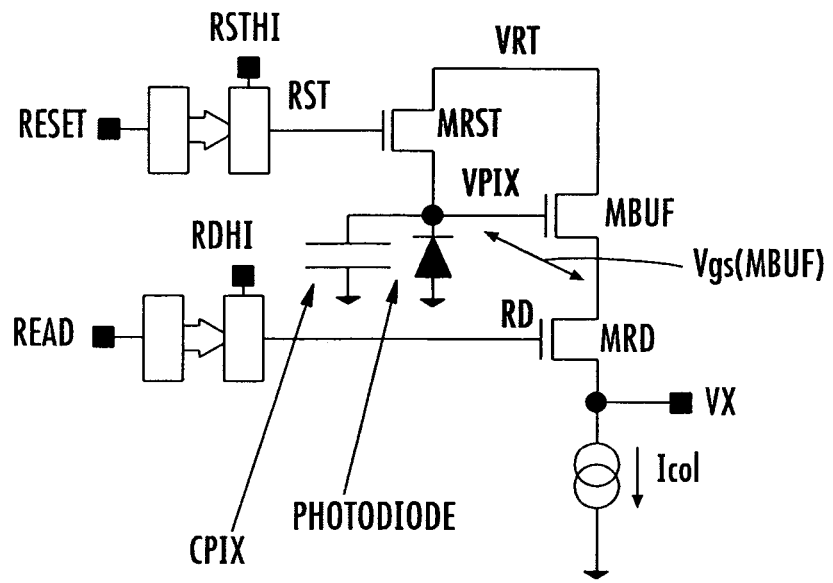
FIGS. 1a and 1b are schematic diagrams of a three-transistor pixel according to the prior art.
Figure 1B:
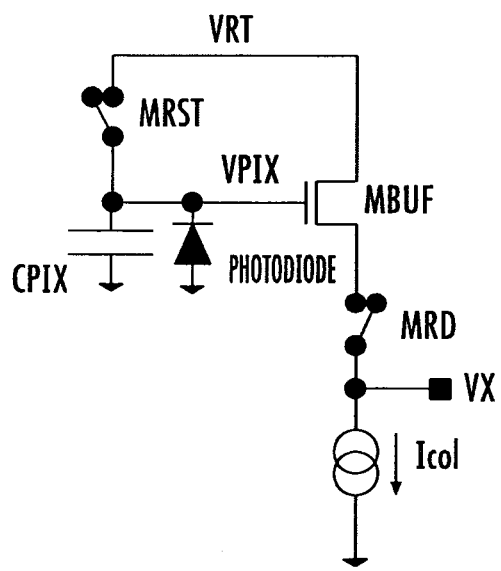
Figure 2:
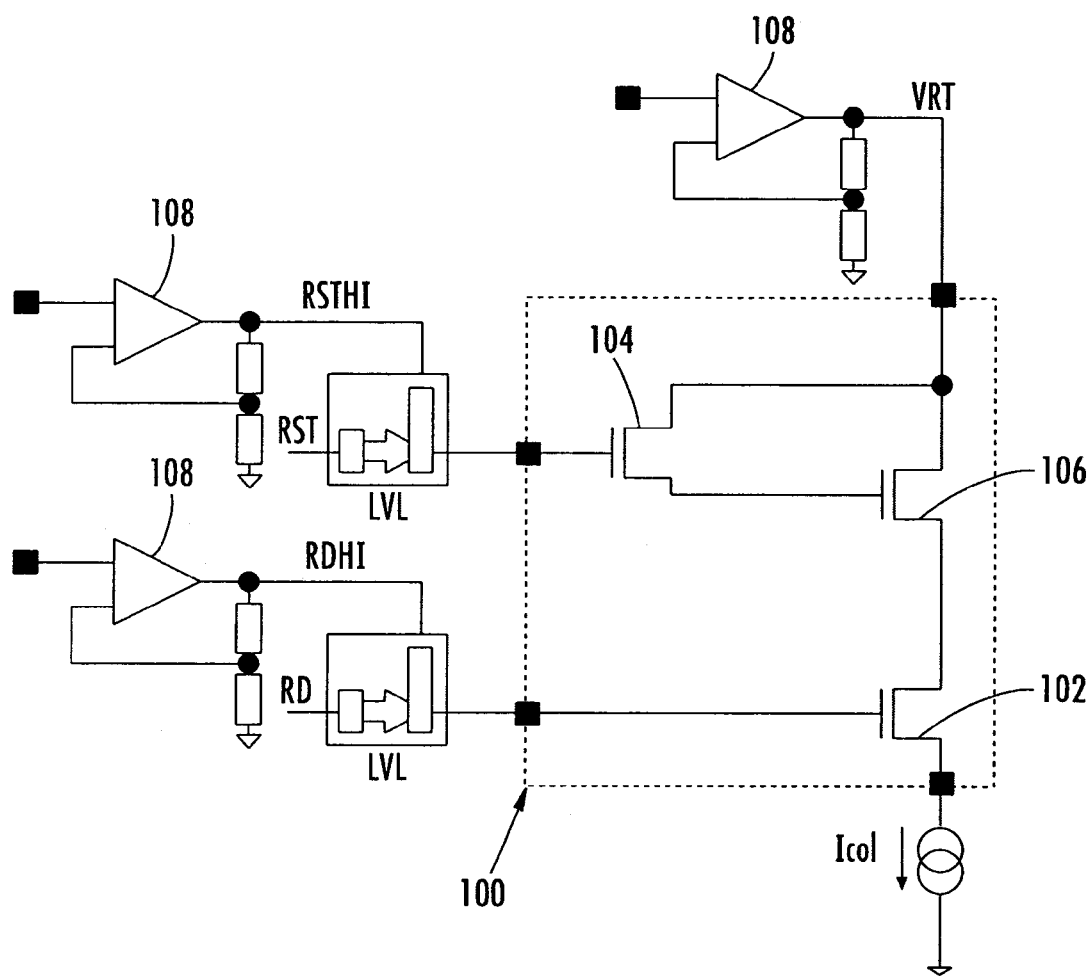
FIG. 2 is a schematic diagram of a three-transistor pixel with reference power supplies in accordance with the invention.

Referring to FIG. 2, a pixel 100 is shown which comprises a photodiode (not shown), a read transistor 102, a reset transistor 104 and a follower transistor 106. The photodiode voltage will be present at the gate of the follower transistor 106. The follower transistor 106 is used as a source follower to enable the photodiode voltage to be read out.

The pixel 100 requires four reference supplies to enable correct operation. The four reference supplies include a reference voltage VRT, a reference voltage RSTHI, a reference voltage RDHI, and a bias reference current ICOL. To enable a reset operation on the pixel 100, a reset signal RST is received which enables the reset reference voltage RSTHI to operate the reset transistor 104. Similarly, to enable a read operation on the pixel 100, a read signal RD is received which enables the read reference voltage RDHI to operate the read transistor 102.

If the reference voltage VRT varies during a read operation of an array of pixels, image output quality is affected through inconsistencies in the pixel readout voltage. It has also been discovered that if the reference voltage RSTHI or the reference voltage RDHI vary during a read operation, image output quality is also affected. Consequently, it is desirable to prevent the reference voltages VRT, RSTHI, and RDHI from varying.

Figure 4:
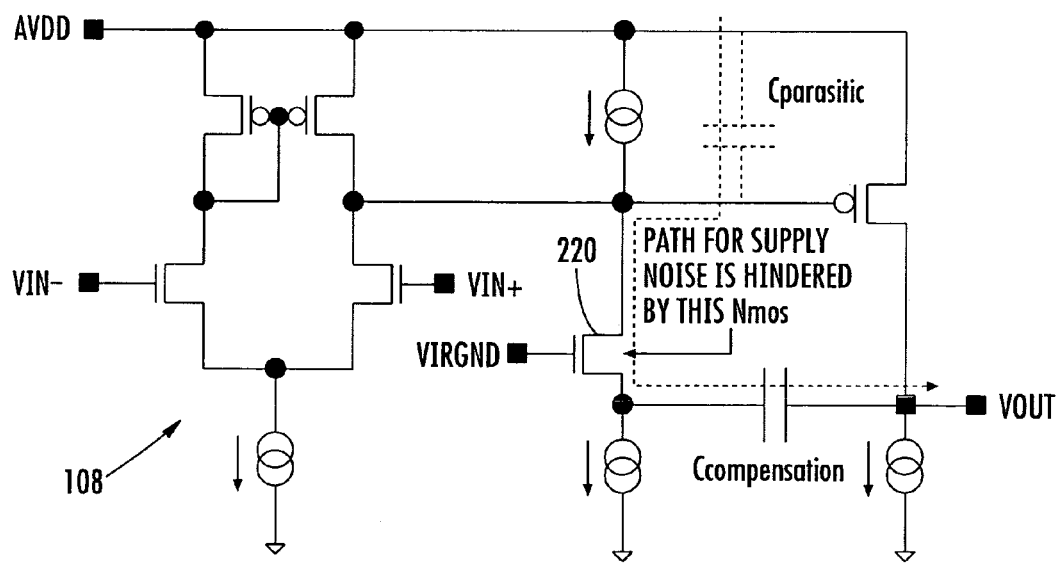
FIG. 4 is a schematic diagram of a two stage amplifier in accordance with the invention.

To provide the reference voltages VRT, RDHI, RSTHI, a non-inverting voltage amplifier 108 is used. The non-inverting voltage amplifier 108 has a circuit as shown in FIG. 4. The circuit 108 is based on a two-stage amplifier with Ahuja frequency compensation as described in B. K Ahuja, "An Improved Frequency Compensation Technique For CMOS Operational Amplifiers", IEEE Journal of Solid State Circuits, vol. 18, pp. 629-633, 1983.

Figure 3:
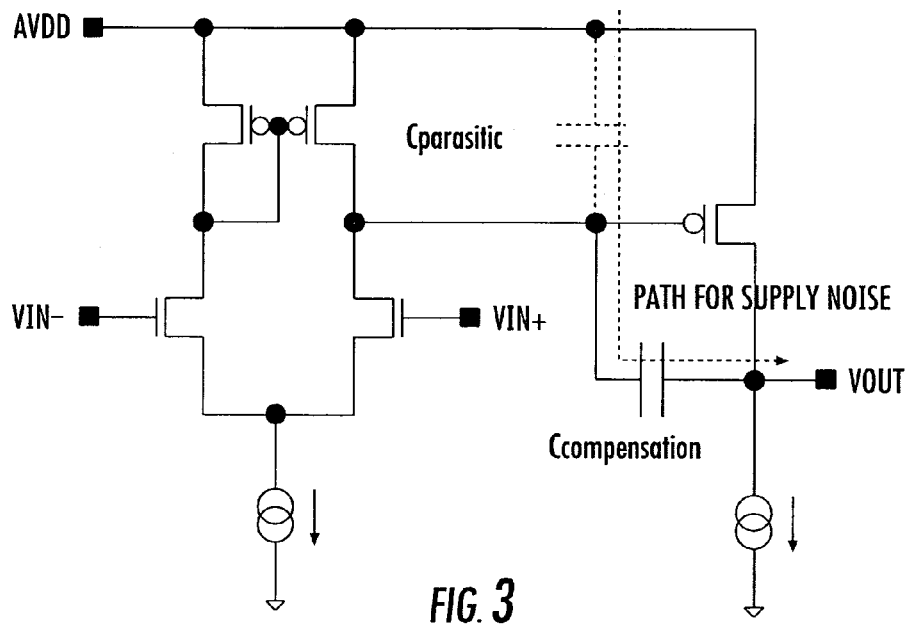
FIG. 3 is a schematic diagram of a two stage amplifier used for reference voltage supply according to the prior art.

A sourcing general Miller amplifier, as shown in FIG. 3, suffers from poor supply rejection at higher frequencies, as the supply noise is directly connected to the output of the amplifier via a compensation capacitor $C_{compensation}$ and the parasitic capacitance $C_{parasitic}$. Ahuja compensation eliminates this path by inserting transistor 220 (FIG. 4) in the path from the positive supply to the output, while still providing phase compensation. Such an approach improves power supply ripple rejection at high frequencies.

Figure 5:
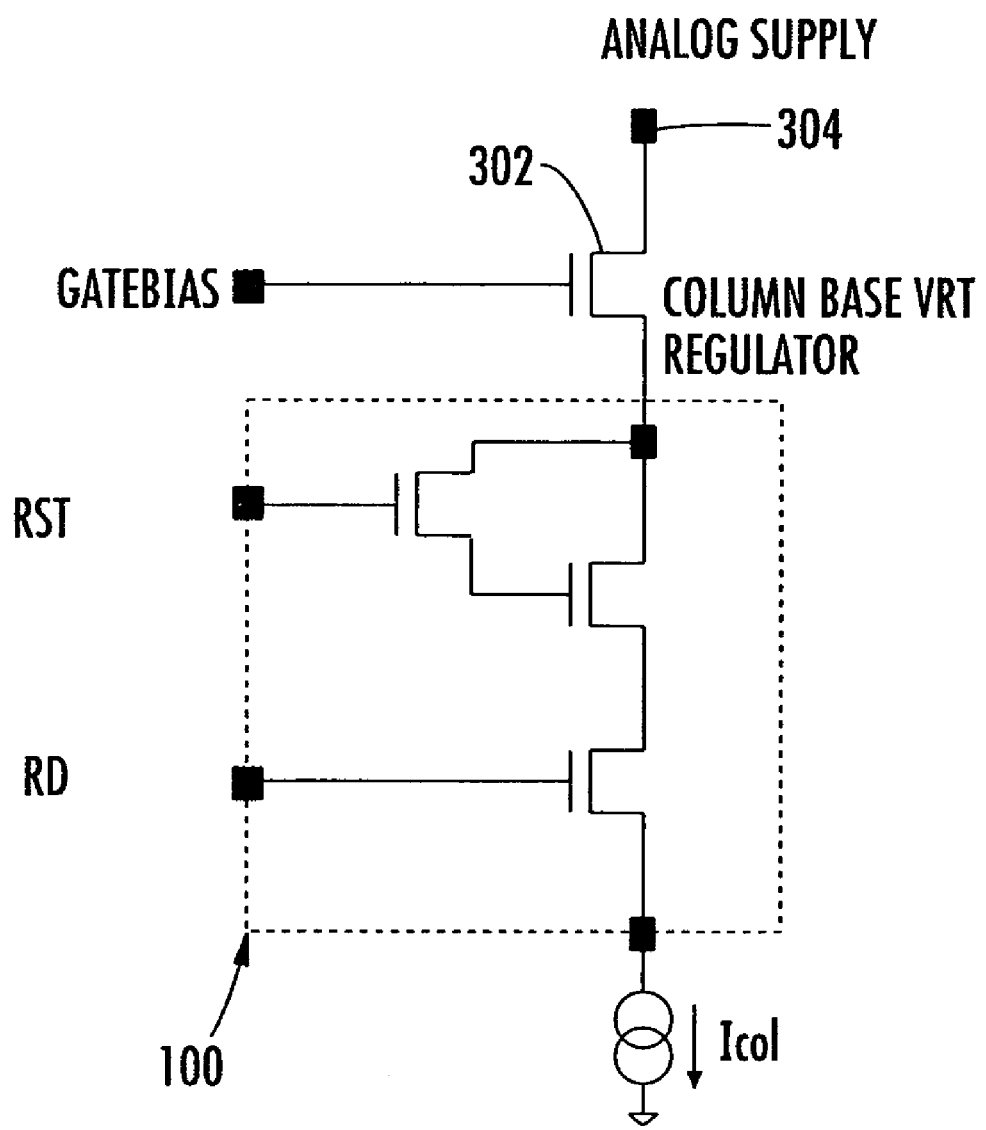
FIG. 5 is an alternative embodiment of a reference power supply connected to a light detecting device in accordance with the invention.

Referring now to FIG. 5, the reference voltage VRT is supplied by a reference transistor 302 instead of the voltage amplifier 108. By replacing the non-inverting voltage amplifier 108 by a reference transistor 302, less current is used with similar results. The capacitance of the reference transistor 302 rejects variance from a supply 304, thereby reducing any variance of the reference voltage VRT.

Modifications may be made without departing from the scope of the invention. For example, alternative amplifier circuit designs may be used which also eliminate power supply ripple.

That which is claimed is:

1. An image sensor comprising:
   at least one pixel; and
   at least one power supply ripple rejection circuit including an input connected to a supply voltage, and an output providing an output voltage to said at least one pixel, said at least one power supply ripple rejection circuit for reducing variations in the supply voltage.

2. An image sensor according to claim 1 wherein the output voltage comprises at least one of a sensor voltage, a read voltage, and a reset voltage.

3. An image sensor according to claim 1 wherein said at least one power supply ripple rejection circuit comprises an amplifier connected to the input and the output.

4. An image sensor according to claim 3 wherein said amplifier comprises an Ahuja compensation transistor.

5. An image sensor according to claim 1 wherein said at least one power supply ripple rejection circuit comprises a transistor, said transistor operating as a source follower with said at least one pixel acting as a load of the source follower.

6. A method for reducing variations in the supply voltage for an image sensor comprising at least one pixel, the method comprising:

connecting an input of at least one power supply ripple rejection circuit to the supply voltage, and an output of the at least one power supply ripple rejection circuit to the at least one pixel, with the output providing an output voltage thereto.

7. A method according to claim 6 wherein the output voltage comprises at least one of a sensor voltage, a read voltage, and a reset voltage.

8. A method according to claim 6 wherein the at least one power supply ripple rejection circuit comprises an amplifier connected to the input and the output.

9. A method according to claim 8 wherein the amplifier comprises an Ahuja compensation transistor.

10. A method according to claim 6 wherein the at least one power supply ripple rejection circuit comprises a transistor, the transistor operating as a source follower with the at least one pixel acting as a load of the source follower.

11. An image sensor comprising:

a supply voltage;

a plurality of reference voltages; and a plurality of power supply ripple rejection circuits, with a power supply ripple rejection circuit for each respective reference voltage, and each power supply ripple rejection circuit including an input coupled to the supply voltage and an output coupled to the respective reference voltage for reducing variations in the supply voltage on the respective reference voltage.

12. An image sensor according to claim 11 further comprising a first sensor reference voltage, a second read reference voltage, and a third reset reference voltage.

* * * * *

UNITED STATES PATENT AND TRADEMARK OFFICE
CERTIFICATE OF CORRECTION

PATENT NO. : 7,659,498 B2  Page 1 of 1
APPLICATION NO. : 11/040074
DATED : February 9, 2010
INVENTOR(S) : Purcell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 7 days.

Signed and Sealed this

Twenty-eighth Day of December, 2010

David J. Kappos
*Director of the United States Patent and Trademark Office*